US012308193B2

(12) United States Patent
Burnot

(10) Patent No.: US 12,308,193 B2
(45) Date of Patent: May 20, 2025

(54) RESETTING RCD MECHANISM BY THE HANDLE

(71) Applicant: Schneider Electric Industries SAS, Rueil Malmaison (FR)

(72) Inventor: Claude Burnot, Echirolles (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 18/405,304

(22) Filed: Jan. 5, 2024

(65) Prior Publication Data

US 2024/0242911 A1 Jul. 18, 2024

(30) Foreign Application Priority Data

Jan. 17, 2023 (FR) ...................................... 2300432

(51) Int. Cl.
*H01H 83/14* (2006.01)
*H01H 75/02* (2006.01)

(52) U.S. Cl.
CPC .......... *H01H 83/144* (2013.01); *H01H 75/02* (2013.01)

(58) Field of Classification Search
CPC ...................................................... H01H 75/02
USPC ......................................................... 361/93.1
See application file for complete search history.

(56) References Cited

U.S. PATENT DOCUMENTS 6,897,747 B2 * 5/2005 Brandon .............. H01H 71/524 335/172

FOREIGN PATENT DOCUMENTS

| | | | | |
|---|---|---|---|---|
| AU | 2022201979 | A1 * | 10/2022 | ......... H01H 71/1054 |
| AU | 2022201980 | A1 * | 10/2022 | ............... B64D 1/06 |
| FR | 3121270 | A1 | 9/2022 | |
| FR | 3121271 | A1 | 9/2022 | |
| FR | 3121272 | A1 | 9/2022 | |

OTHER PUBLICATIONS

French Search Report and Written Opinion dated Jul. 10, 2023 for corresponding French Patent Application No. FR2300432, 9 pages.

* cited by examiner

*Primary Examiner* — Yemane Mehari
(74) *Attorney, Agent, or Firm* — Troutman Pepper Locke LLP

(57) ABSTRACT

An electrical protection device, including a switching mechanism configured to switch between a set configuration and a tripped configuration, and a slide movable between a set position and a disengaged position. The electrical protection device further includes a resetting hook kinematically linked to a switching lever, and the slide supports a slide hook. When the slide is in the disengaged position, the resetting hook and the slide hook are ready to be engaged, and when the slide is in the set position, the slide hook and the resetting hook are spaced apart from each other and resetting of the electrical protection device results in engagement of the slide hook and the resetting hook and in a displacement of the slide.

10 Claims, 9 Drawing Sheets

RESETTING RCD MECHANISM BY THE HANDLE

TECHNICAL FIELD

The present invention relates to an electrical protection device and to a method for resetting such a device.

BACKGROUND

An electrical installation generally comprises various electrical protection devices. The electrical protection devices notably include a circuit breaker, the purpose of which is to protect the electrical installation or an individual from an electrical fault in an electrical circuit of the installation, by opening this electrical circuit. For example, the circuit breaker is tripped by an overload, a short-circuit or a differential electrical fault within this circuit. Several different devices can be used to protect against various types of electrical faults, for example, a first device for protecting against overloads and short-circuits, and another device for protecting against a differential electrical fault. However, this increases the overall size of a protection system including these various devices.

It is also known for a single device to be used for protecting against these three types of electrical fault. Document FR 3121270 A1 describes a protection device providing protection against overloads, short-circuits and differential electrical faults. This device, which is generally satisfactory, comprises a clamp spring and a slide that is configured to switch from an initial set position to a disengaged position when an electrical fault occurs, then to automatically return to its initial set position under the action of the clamp spring. However, the mechanical power developed by the clamp spring is not always sufficient to allow the slide to return to its initial set position.

SUMMARY

The aim of the present invention is to overcome the aforementioned disadvantage by proposing a new electrical protection device in which returning the slide to its initial set position is made more reliable.

To this end, the aim of the invention is an electrical protection device, comprising a casing, a first conduction path, which comprises a first movable contact housed in the casing and movable between a conduction position and an isolation position, a switching mechanism, which is housed in the casing and which is configured to switch between a set configuration, in which the switching mechanism places the movable contact in the conduction position, and a tripped configuration, in which the switching mechanism places the movable contact in the isolation position. The electrical protection device also comprises a first tripping device, which is housed in the casing and which is configured to trip switching of the switching mechanism from the set configuration to the tripped configuration when the first tripping device is initiated by an electrical fault, and a switching lever that is rotatable about a lever axis, operable by a user between an open position, for placing the switching mechanism in the tripped configuration, and a closed position, for placing the switching mechanism in the set configuration, and operable by the switching mechanism from its closed position to its open position, when the switching mechanism is switched to the tripped configuration under the effect of the first tripping device. The electrical protection device also comprises a slide, which comprises a locking relief and which is movable relative to the casing, between a set position and a disengaged position, a slide spring, which applies an actuation force on the slide that tends to move the slide from the set position to the disengaged position, a latch, which comprises a blocking relief configured to block the slide in the set position, the latch being movable between a holding position, in which the latch holds the slide in the set position by means of the blocking relief, which engages with the locking relief when the slide is in the set position, and an unlocked position, in which the blocking relief and the locking relief are offset relative to each other and the latch allows the slide to be moved from its set position to its disengaged position, the first tripping device being configured to move the latch from the holding position to the unlocked position when the first tripping device is initiated.

According to the invention, the electrical protection device further comprises a resetting hook, kinematically linked to the switching lever, such that it moves with the switching lever when the switching lever rotates about the lever axis between its open position and its closed position, while the slide supports a slide hook. Furthermore, when the slide is in the disengaged position, the resetting hook and the slide hook face each other and are ready to be engaged by rotating the switching lever between its open position and its closed position, and the latch is held in the unlocked position by the slide. When the slide is in the set position, the slide hook and the resetting hook are spaced apart from each other. Finally, the transition of the switching lever from its open position to its closed position causes the slide hook and the resetting hook to engage and the switching lever to move the slide until the electrical protection device is reset, with the slide transitioning from its disengaged position to its set position and the switching mechanism switching to the set configuration.

By virtue of the invention, a force developed by the switching lever, actuated by a user, is used to move the slide from the disengaged position to the set position, rather than using only a force developed by a clamp spring. Thus, the force that is provided is always sufficient for moving the slide to its set position after the electrical protection device has been tripped. Furthermore, the tripping and resetting of the protection device remain unchanged. The first tripping device is made operational before the switching mechanism switches to the set configuration, i.e., the switching mechanism is reset, allowing the individual or the electrical installation to be protected as soon as the device is reset, i.e., as soon as the circuit is closed and the electrical current is flowing in the circuit.

According to other advantageous aspects of the invention, the device comprises the following features, taken in isolation or according to any technically possible combination:

- The casing comprises a ramp for guiding the resetting hook configured to disengage the resetting hook and the slide hook when the switching lever transitions from its open position to its closed position.
- The electrical protection device further comprises an indicator that is housed in the casing and that is movable relative to the casing between a visible position and a position not visible from outside the casing, and wherein the slide is adapted to place the indicator in the visible position when it is in the disengaged position, and to place the indicator in the non-visible position when the slide is in the set position.
- The latch is rotatable between its holding position and its unlocked position about a latch axis; the latch is subjected to the action of a return spring that returns it to its holding position; the blocking relief is a lug that radially extends relative to the latch axis; and the locking relief is a notch in the slide configured to receive the blocking relief in the position for holding the latch.

The electrical protection device further comprises a second conduction path, which is electrically isolated from the first conduction path and which comprises a second movable contact housed in the casing and movable between a conduction position and an isolation position; and the first tripping device is a differential tripping device, which comprises a differential sensor, configured to be initiated when a differential current exceeds a predetermined threshold; and a relay, configured to drive the latch from the holding position to the unlocked position, by the sole action of electrical energy from the differential sensor, and generated under the effect of the differential current, while the differential current exceeds the predetermined threshold.

The first conduction path is a neutral conduction path, the second conduction path is a phase conduction path and the transition of the switching lever from its open position to its closed position causes the first movable contact to transition to its conduction position before the second movable contact transitions to its conduction position.

The device further comprises a snap-closing pawl, configured to hold the second movable contact in its isolation position over a first portion of a displacement stroke of the switching lever between its open position and its closed position and to release the second movable contact on passing a predetermined point of the displacement stroke of the switching lever.

The device comprises a second and a third tripping device and wherein the first tripping device is a differential tripping device, the second tripping device is an electrical overload tripping device and the third tripping device is a short-circuit tripping device.

The casing is less than 25 mm wide, preferably less than 20 mm wide, preferably equal to 18 mm wide.

A further aim of the present invention is a method for resetting the aforementioned electrical protection device, by actuating the switching lever so as to rotate about the lever axis, with this method comprising at least the following steps, which successively occur when the switching lever is actuated by the user:

a) a first step of engaging between the resetting hook and the slide hook;
b) a second step of translationally moving the slide from the disengaged position to the set position under the action of the resetting hook, until the latch is released from its unlocked position;
c) a third step of moving the latch from its unlocked position to its holding position
d) a fourth step of disengaging the resetting hook and the slide hook; and
e) a fifth step of switching the switching mechanism to the set configuration.

BRIEF DESCRIPTION OF THE DRAWINGS

The invention will be better understood upon reading the following description, which is provided solely by way of a non-limiting example and with reference to the drawings, in which.

DETAILED DESCRIPTION

Figure 1:
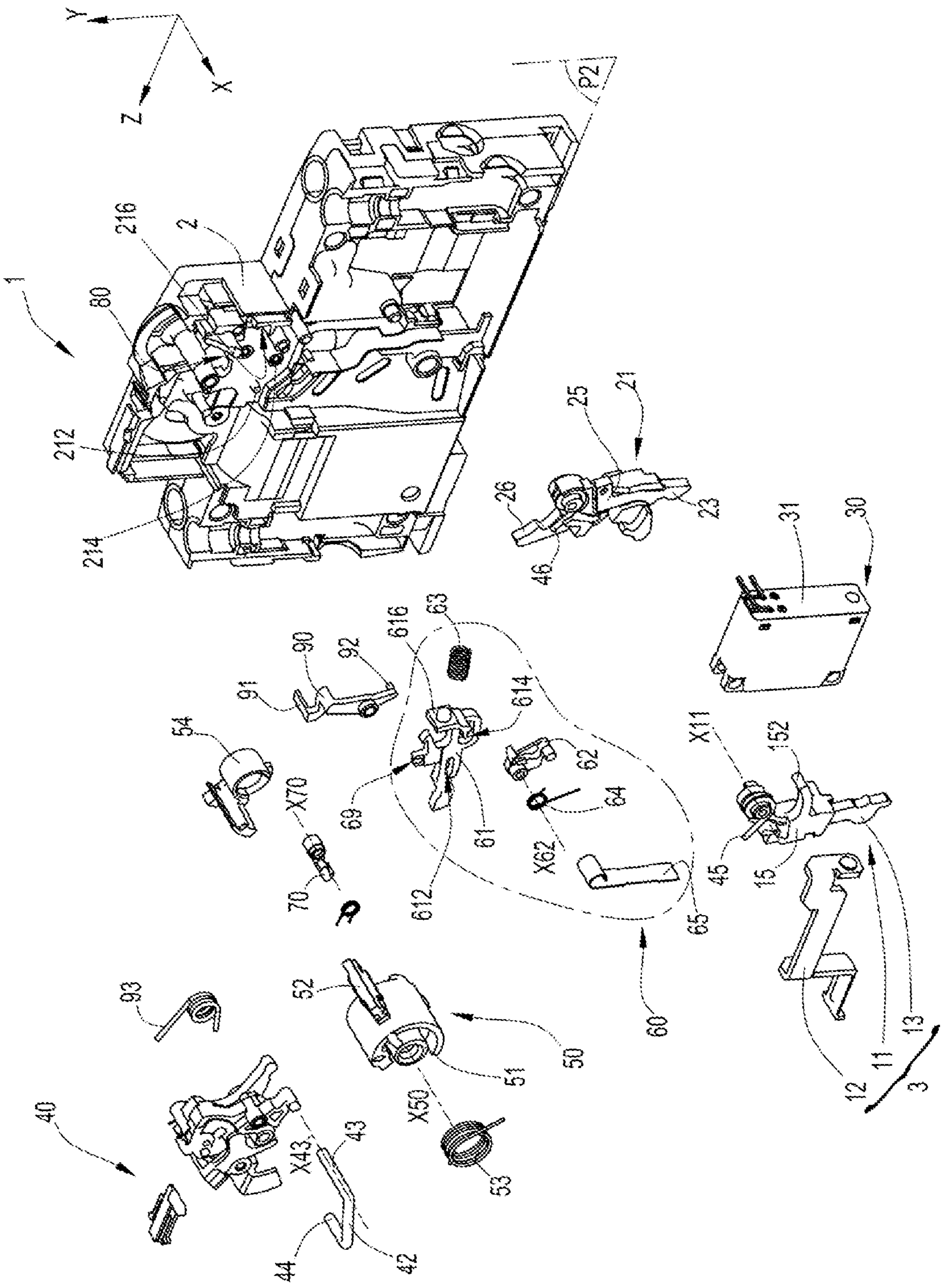
FIG. 1 is an exploded view of the mechanisms of an electrical protection device according to the invention.

FIG. 1 shows an exploded view of an electrical protection device 1 according to the invention. This electrical protection device 1 can be a circuit breaker, as shown in FIG. 1, and protects electrical installations against abnormal conditions, such as short-circuits, overcurrents or current leakage to earth.

A width direction X, a depth direction Y and a height direction Z are defined, which are perpendicular to each other and are fixed relative to the device 1. By assumption, the X direction is considered to be horizontal and normal to the plane shown in FIGS. 2 to 7 and 9.

The electrical protection device 1 comprises a casing 2, which is basically closed and contains most of the other elements of the electrical protection device 1. The casing 2 is made of an electrically isolating material. The X, Y and Z directions are fixed relative to the casing 2.

In FIGS. 1 to 7, only part of the casing 2 is visible, namely a half-shell. The casing 2 comprises another half-shell that is not visible in the figures and is generally symmetrical to the one shown, relative to a plane P2 that delimits the half-shell on the side thereof that is visible in FIG. 1.

Figure 2:
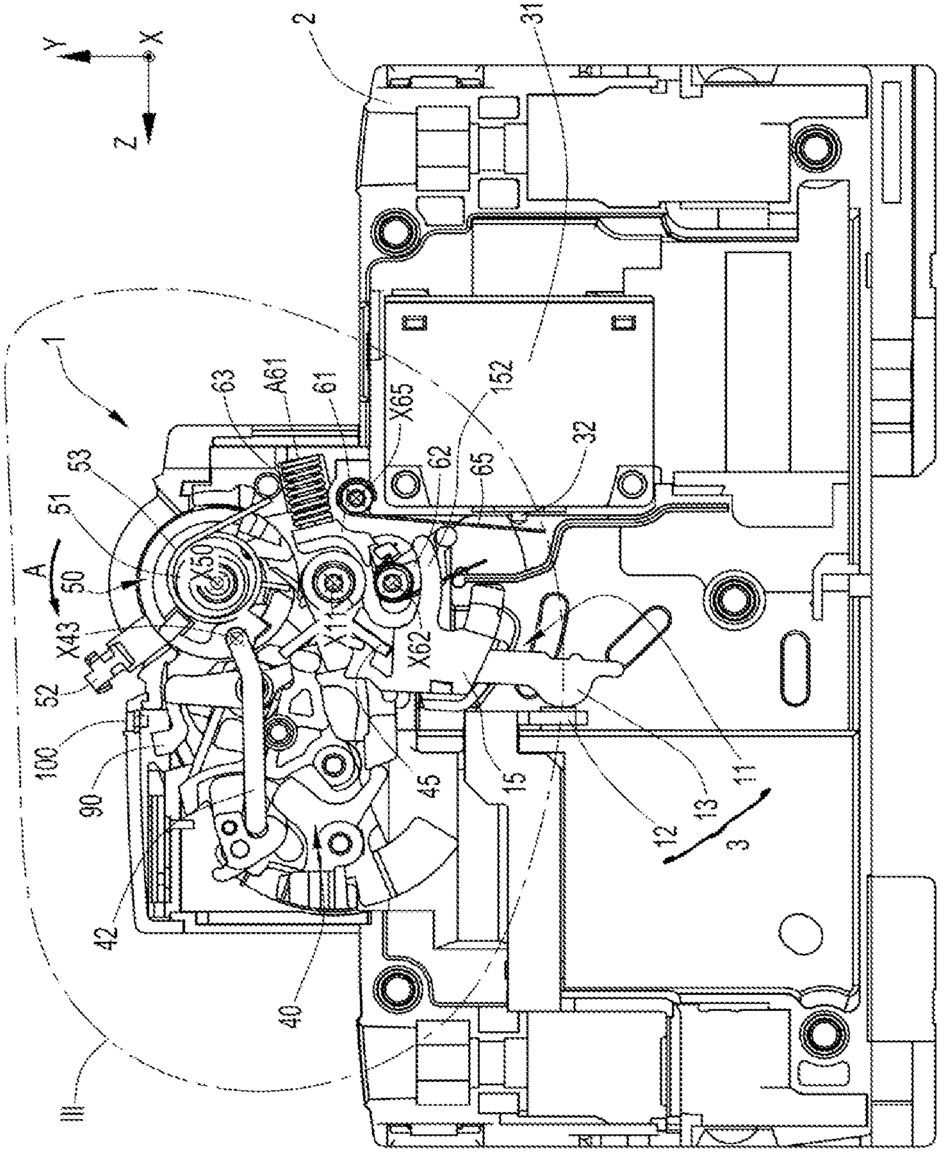
FIG. 2 is a side view of the electrical protection device of FIG. 1, in a first configuration.

The electrical protection device 1 comprises a first conduction path 3, which comprises a first movable contact 11 and a first fixed contact 12. The first conduction path 3, notably visible in FIGS. 1 and 2, is sometimes called neutral. The contact 12 is fixed relative to the casing 2 and is located facing the movable contact 11, in the Z direction. The movable contact 11 preferably comprises a conductive end 13, providing the electrical contact function. The movable contact 11 preferably comprises a contact holder 15, which supports the end 13. The movable contact 11 can be pivoted, relative to the casing 2, by means of the contact holder 15, about a movable contact axis X11, parallel to the X direction. This pivoting occurs between a conduction position, shown in FIG. 2, and an isolation position, shown in FIG. 9. In the conduction position of the movable contact 11, the conductive end 13 is in electrical contact with, and in abutment against, the fixed contact 12. In the isolation position, the end 13 of the movable contact 11 is spaced apart from the fixed contact 12, so as to be electrically isolated therefrom.

Figure 9:
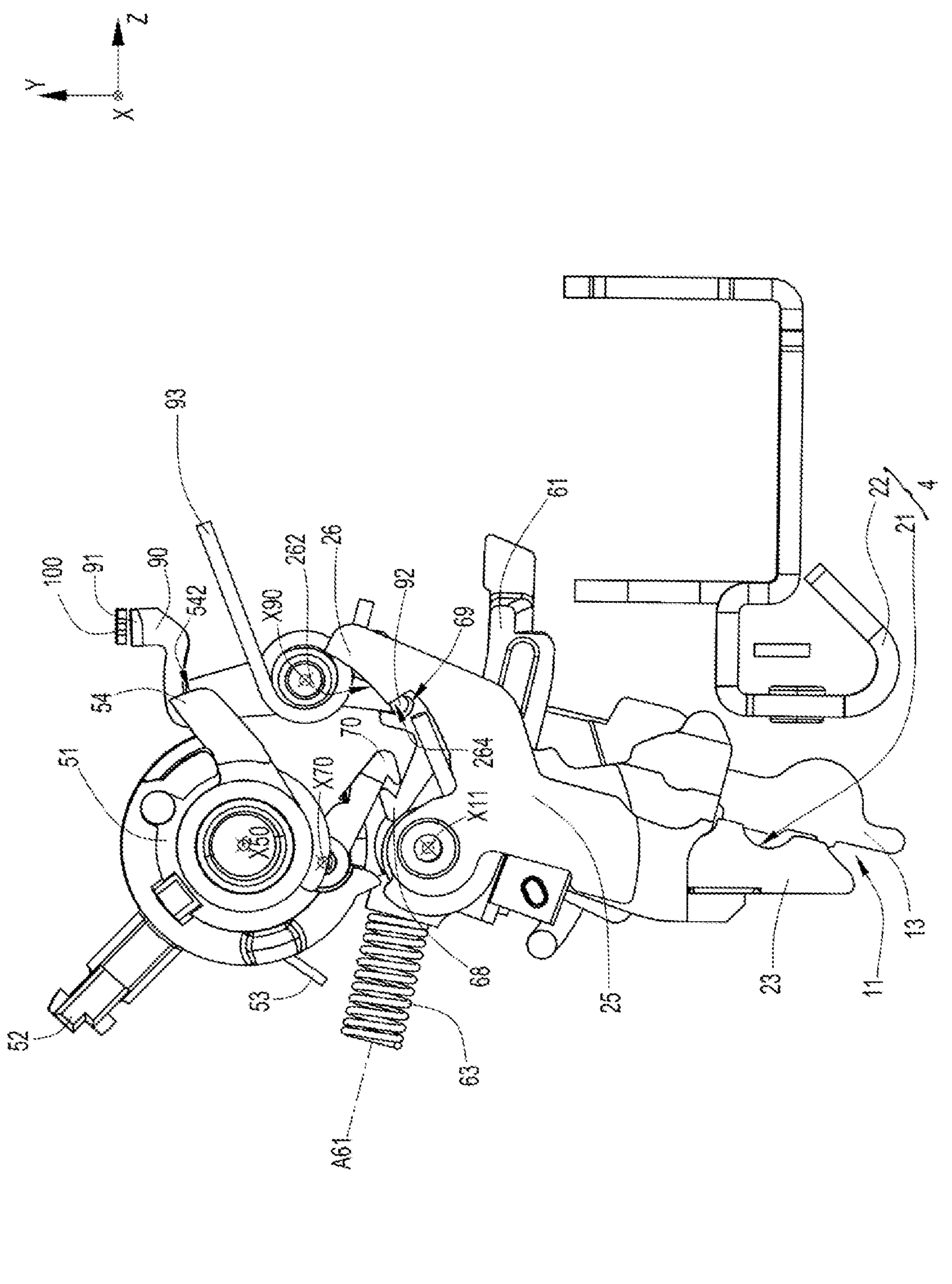
FIG. 9 is a side view of part of the electrical protection device in the second configuration, seen from an angle opposite that of FIG. 4.

The electrical protection device 1 advantageously comprises a second conduction path 4, comprising a second movable contact 21 and a second fixed contact 22. The conduction path 4, notably visible in FIG. 9, is sometimes called phase. The second movable contact 21 preferably comprises a conductive end 23 and a contact holder 25. The second movable contact 21 can be pivoted relative to the casing 2, by means of the contact holder 25, about the axis X11, i.e., about the same axis as that of the movable contact 11. As an alternative embodiment, however, the contacts 11 and 21 could be pivoted about two separate axes, preferably parallel to each other. The second movable contact 21 is pivoted between a conduction position, not shown, and an isolation position, shown in FIG. 9. In the conduction position of the movable contact 21, the conductive end 23 is in electrical contact with, and in abutment against, the fixed contact 22. In the isolation position, the conductive end 23 of the movable contact 21 is spaced apart from the fixed contact 22, so as to be electrically isolated therefrom.

Advantageously, the movable contacts 11 and 21 pivot independently relative to the casing 2. When they move from their respective isolation positions to their respective conduction positions, the movable contacts 11 and 21 advantageously rotate in the same direction. In particular, the conductive ends 13 and 23 are then basically moved in the Z direction.

The electrical protection device 1 further comprises at least one tripping device. In the illustrated example, only one tripping device 30 is illustrated. In practice, the electrical protection device 1 advantageously comprises a plurality of tripping devices, typically three tripping devices, each configured to be initiated by an electrical fault of a respective distinct predetermined type. Each tripping device is designed to individually trip the contacts 11 and 21 into the isolation position when one of the tripping devices is initiated. Typically, one of the tripping devices is designed to be initiated by a predetermined electrical fault, such as an electrical overload, and another tripping device is designed to be initiated by a short-circuit, with these two tripping devices generally being combined to form a Miniature Circuit Breaker (MCB).

Advantageously, the tripping device 30 is configured to be initiated by another electrical fault of a predetermined type, namely an electrical fault of the differential type, which is likely to occur between the conduction paths 3 and 4 and earth. The tripping device 30 is therefore a differential tripping device notably initiated by a current leakage to earth, which is likely to occur downstream of the electrical protection device 1, then causing a difference between the value of the strength of the current flowing in the first conduction path 3 and the value of the strength of the current flowing in the second conduction path 4. More specifically, the differential tripping device 30 is initiated when a differential current exceeds a predetermined value, for example, 30 mA (milliamperes), with this differential current being equal to the difference between the current flowing in the conduction path 4 and the current flowing in the conduction path 3.

In the event that only the differential tripping device 30 is present in the electrical protection device 1, the electrical protection device 1 is called a differential switch, or RCCB (Residual Current Circuit Breaker). In the event that the three tripping devices are simultaneously present in the same electrical protection device 1, said device is called a Residual Current Breaker with Over-Current (RCBO).

Preferably, the tripping device 30 comprises a differential current sensor, not shown, and a relay 31. In this case, the relay 31 comprises a movable rod 32, which is moved relative to the casing 2 between a set position, shown in FIG. 2, and a tripped position, not shown, when the tripping device 30 is initiated. In this case, the rod 32 is moved from the set position to the tripped position in the Z direction. The operation of the tripping device 30 is in accordance with the technical teaching of document FR 3121270 A1.

The differential sensor comprises, for example, a ferromagnetic toroid, not shown, supporting two electromagnetic coils, one advantageously formed by part of the conduction path 3 and the other advantageously formed by part of the conduction path 4.

The toroid of the differential sensor advantageously supports a third coil, connected to the relay 31. Since the three windings of the tripping device 30 are wound around the same toroid, an electric current is induced within the coil connected to the relay 31 when the differential current of the paths 4 and 3 is non-zero. The third coil then electrically powers the relay 31 with the induced current. Preferably, the movement of the rod 32 from the set position to the tripped position is actuated by the relay 31 solely on the basis of the electrical current induced by the differential sensor. Then, no other energy source is provided for the tripping device 30. More generally, the relay 31 is preferably configured to actuate the movement of the rod 32 to the tripped position by the sole action of the electrical energy from the differential sensor, when the differential current exceeds the predetermined threshold.

Once the movable rod 32 has reached the tripped position, it must be returned to the set position in order to reset the relay 31 and thus allow the relay 31 to again actuate the rod 32 in the event of a differential fault.

The electrical protection device 1 also comprises a switching mechanism 40.

The switching mechanism 40 is housed in the casing 2. The switching mechanism 40 is configured to switch between a set configuration, shown in FIG. 2, in which the switching mechanism 40 places the first and second movable contacts 11 and 21 in the conduction position, and a tripped configuration, partly shown in FIG. 4, in which the switching mechanism 40 places the first and second movable contacts 11 and 21 in the isolation position. This switching is enabled by a spring 93, which tends to switch the switching mechanism 40 to its tripped configuration.

A first contact spring 45 is in abutment against the first movable contact 11, in particular against the contact holder 15, and against the switching mechanism 40. A second contact spring 46 is in abutment against the second movable contact 21, in particular against the contact holder 25, and against the switching mechanism 40. The contact springs 45 and 46 are helical torsion springs. The first and second contact springs 45 and 46 are intended to apply, respectively to the first and second movable contacts 11 and 21, a torque about the axis X11 that tends to bring the first and second movable contacts 11 and 21 into abutment against the first and second fixed contacts 12 and 22.

The electrical protection device 1 also comprises a switching lever 50. The switching lever 50 is designed to be actuated by a user between an open position and a closed position, and vice versa. The switching lever 50 is pivotable relative to the casing 2, about a lever axis X50, parallel to the X axis, between a closed position, shown in FIGS. 2 and 3, and an open position, shown in FIG. 4.

The switching lever 50 in this case comprises a base 51, by means of which the lever is pivotably mounted on the casing 2. The switching lever 50 comprises a hinge pin 52, supported by the base 51, and by means of which the user can actuate the rotation of the controller 50, by exerting a torque about the lever axis X50. In order to be accessible to the user, the hinge pin 52 is at least partly located outside the casing 2.

The switching mechanism 40 advantageously comprises a spring 53, called "control spring", visible in FIGS. 1, 2 and 9. The control spring 53 applies, to the switching lever 50 and by coming into abutment on the casing 2, a torque about the lever axis X50, which tends to return the switching lever 50 from its closed position to its open position. For example, the control spring 53 is a helical torsion spring, housed inside the base 51 around the lever axis X50, and one branch of which comes into abutment on the switching lever 50 and another branch of which comes into abutment on the inside of the casing 2.

The position of the switching lever 50, visible from outside the casing 2, provides the user with a visual indication of the current configuration commanded for the electrical protection device 1, namely the first and second movable contacts 11 and 21 are in the isolation position when the switching lever 50 is in the open position, and the first and second movable contacts 11 and 21 are in the conduction position when the switching lever 50 is in the closed position.

Advantageously, the switching mechanism 40 comprises a connecting rod 42, visible in FIGS. 1 and 2. The connecting rod 42 comprises an end 43 attached to the controller 50, in particular to the base 51. By means of this end 43, the connecting rod 42 can pivot relative to the switching lever 50, about an axis X43 that is parallel to and not coincident with the lever axis X50. Thus, the rotation of the switching lever 50 is linked to a cranking movement, i.e., an arc of a circle about the axis X50, of the end 43. The connecting rod 42 also comprises another end 44, connected to the remainder of the switching mechanism 40. Thus, when the switching mechanism 40 is in the tripped position, the switching lever 50 is in the open position, and when the switching mechanism 40 is in the set position, the switching lever 50 is in the closed position.

In order to transition the switching mechanism 40 from its set configuration, shown in FIG. 2, to its tripped configuration, the differential tripping device 30 actuates a force amplifier 60, as shown in detail in FIGS. 3 to 9. The force amplifier 60 is entirely separate from the switching mechanism 40, and basically comprises a slide 61, a latch 62, a slide spring 63, but also preferably a return spring 64 and a reset blade 65.

FIGS. 3 to 7 show details of the electrical protection device 1, where some parts of the electrical protection device 1 are not visible in order to improve the visibility of some parts of the force amplifier 60.

Figure 3:
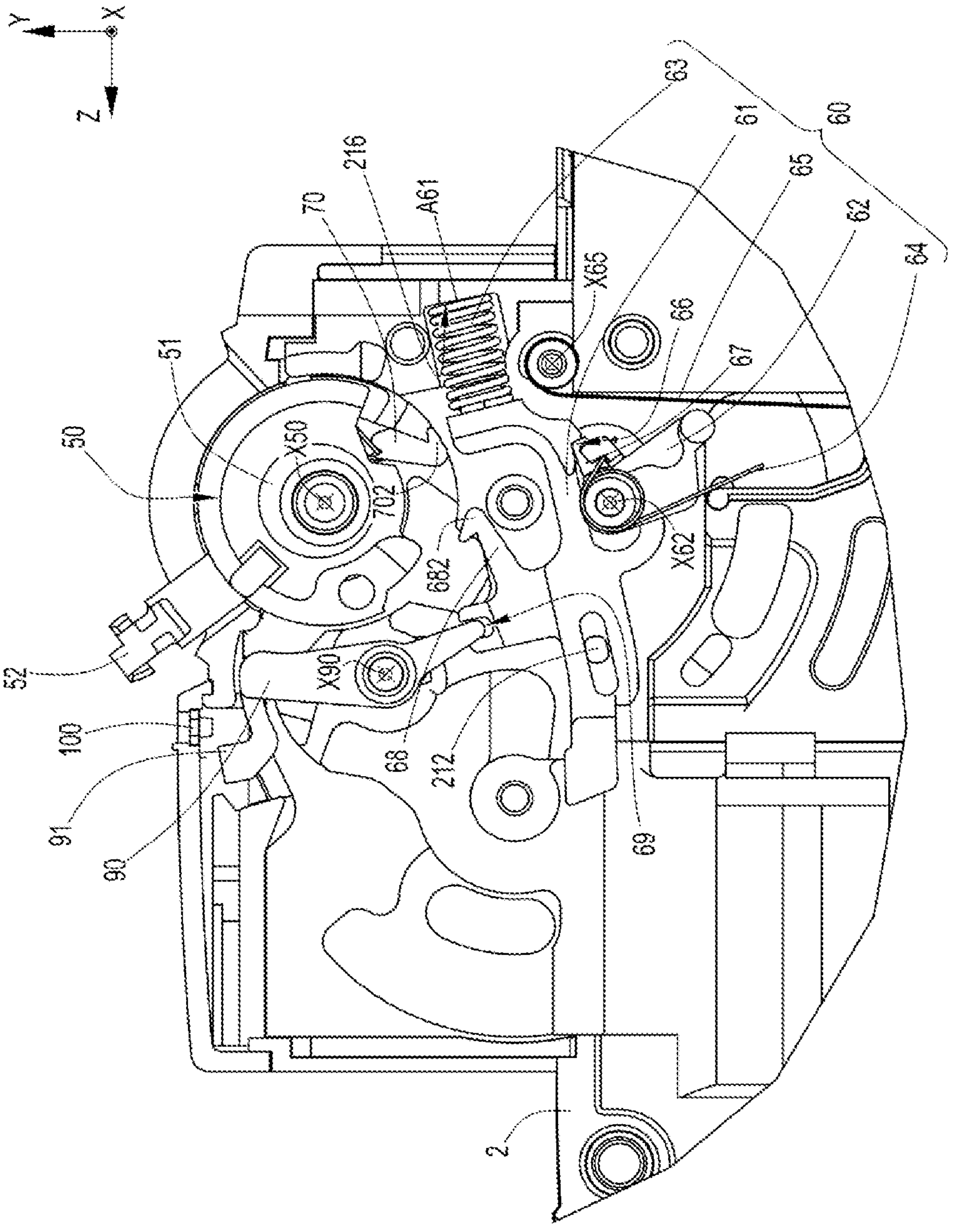
FIG. 3 is a larger-scale view of the detail III in FIG. 2, with some constituent elements of the electrical protection device being omitted.
Figure 4:
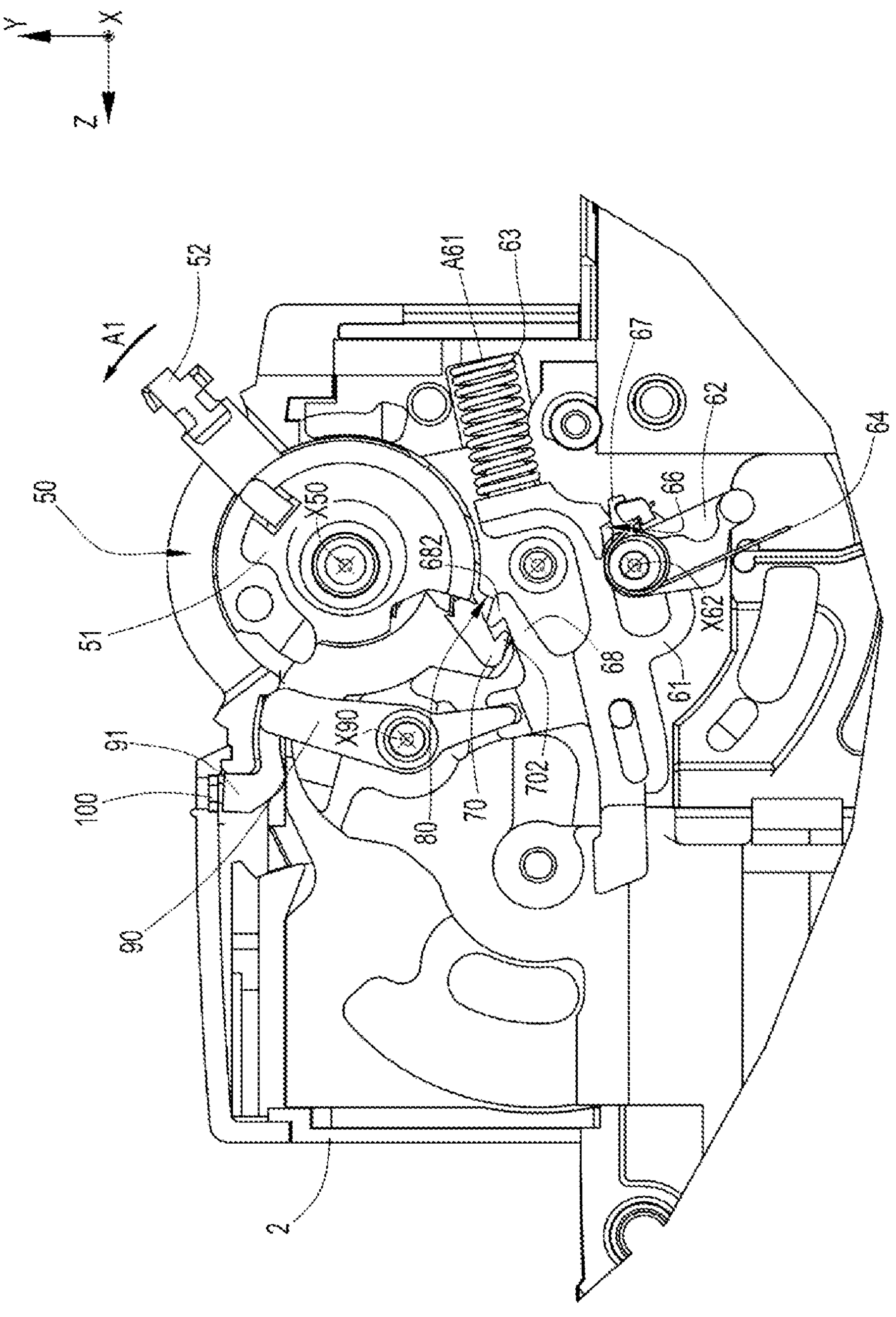
FIG. 4 is a similar view to FIG. 3, with the electrical protection device being in a second configuration.
Figure 5:
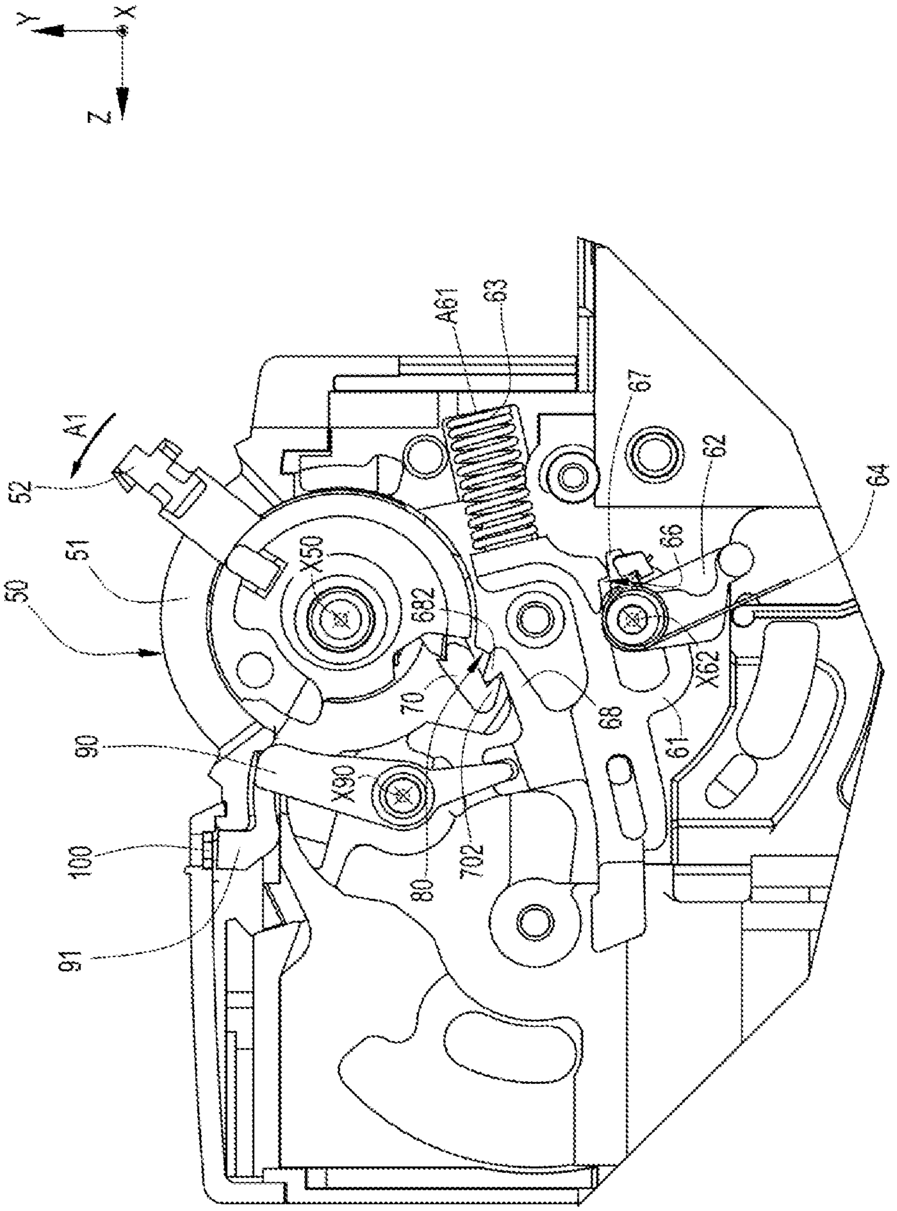
FIG. 5 is a view similar to that of FIG. 3, with the electrical protection device being in a third configuration.
Figure 8:
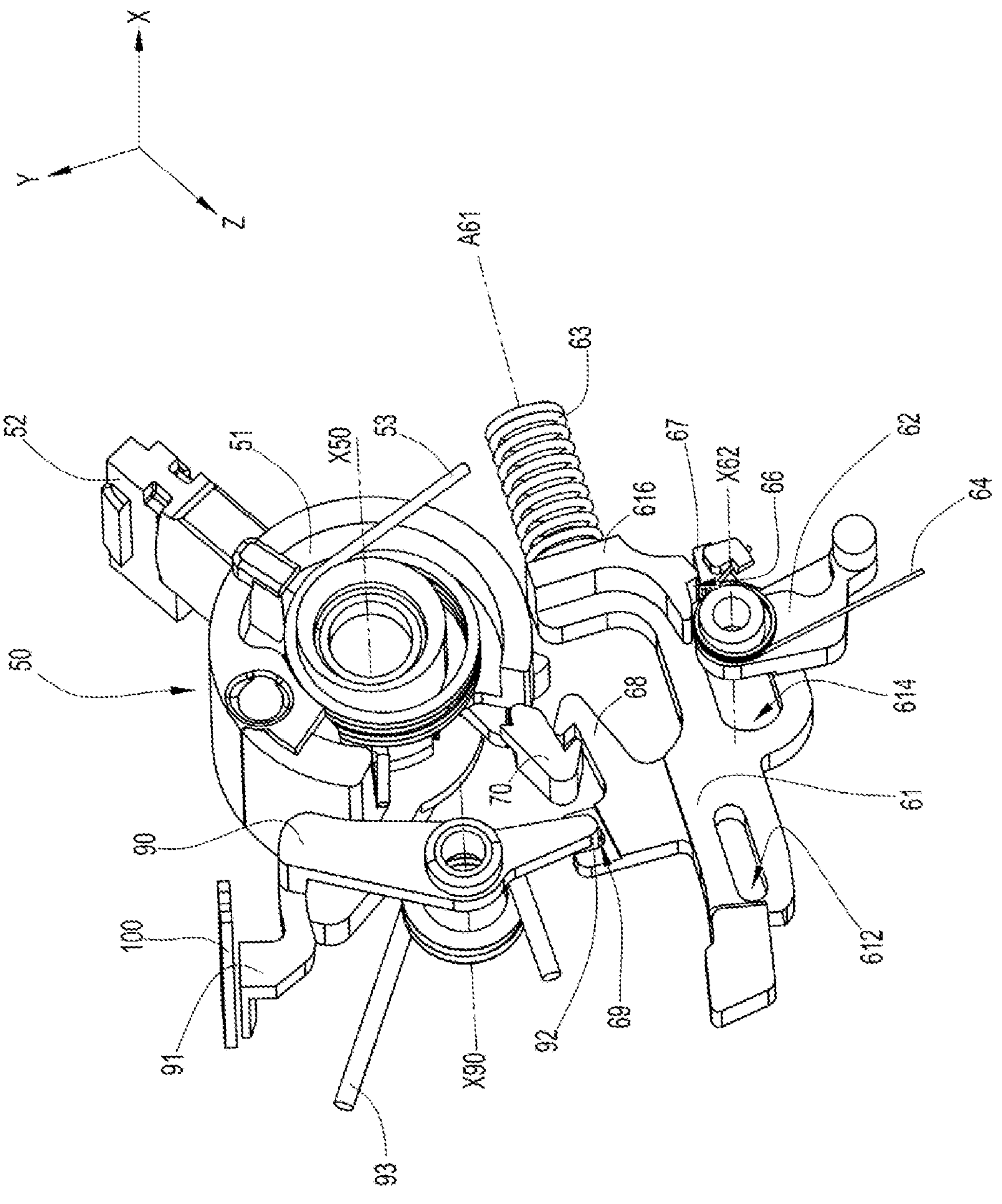
FIG. 8 is a partial perspective view showing some elements of the electrical protection device, in the second configuration.

The slide 61 is translationally movable, relative to the casing 2, between a set position, shown in FIG. 3, and a disengaged position, shown in FIGS. 4, 5 and 8. To this end, the slide 61 slides relative to the casing 2 along an axis A61, which is fixed relative to the casing 2. The axis A61 preferably lies in a plane parallel to the Y and Z directions. In this case, the axis A61 is oblique relative to the Y and Z directions. The slide 61 is preferably moved in a direction that has a horizontal component in the Z direction in order to be moved toward the disengaged position. In order to be translationally guided, the slide 61 comprises, for example, two oblong openings 612 and 614, the greatest length of which is parallel to the axis A61, and by means of which the slide 61 slides on two respective rods 212 and 214 belonging to the casing 2, parallel to the X direction.

The slide spring 63 applies a force, called "actuating force", to the slide 61, that tends to move the slide 61 from its set position to its disengaged position. To this end, the slide spring 63 advantageously comes into abutment on the casing 2, more specifically in a housing 216 provided on the casing. The slide spring 63 in this case is a compression spring oriented parallel to the axis A61, which is interposed between a wall of the casing 2, which forms the bottom of the housing 216, and a support portion 616 of the slide 61. By default, the spring 63 pushes the slide 61 toward its disengaged position.

When the slide 61 is moved from the set position to the disengaged position, the slide 61 drives the switching mechanism 40 from its set configuration to its tripped configuration, causing the first and second movable contacts 11 and 21 to move to their respective isolation positions.

Figure 7:
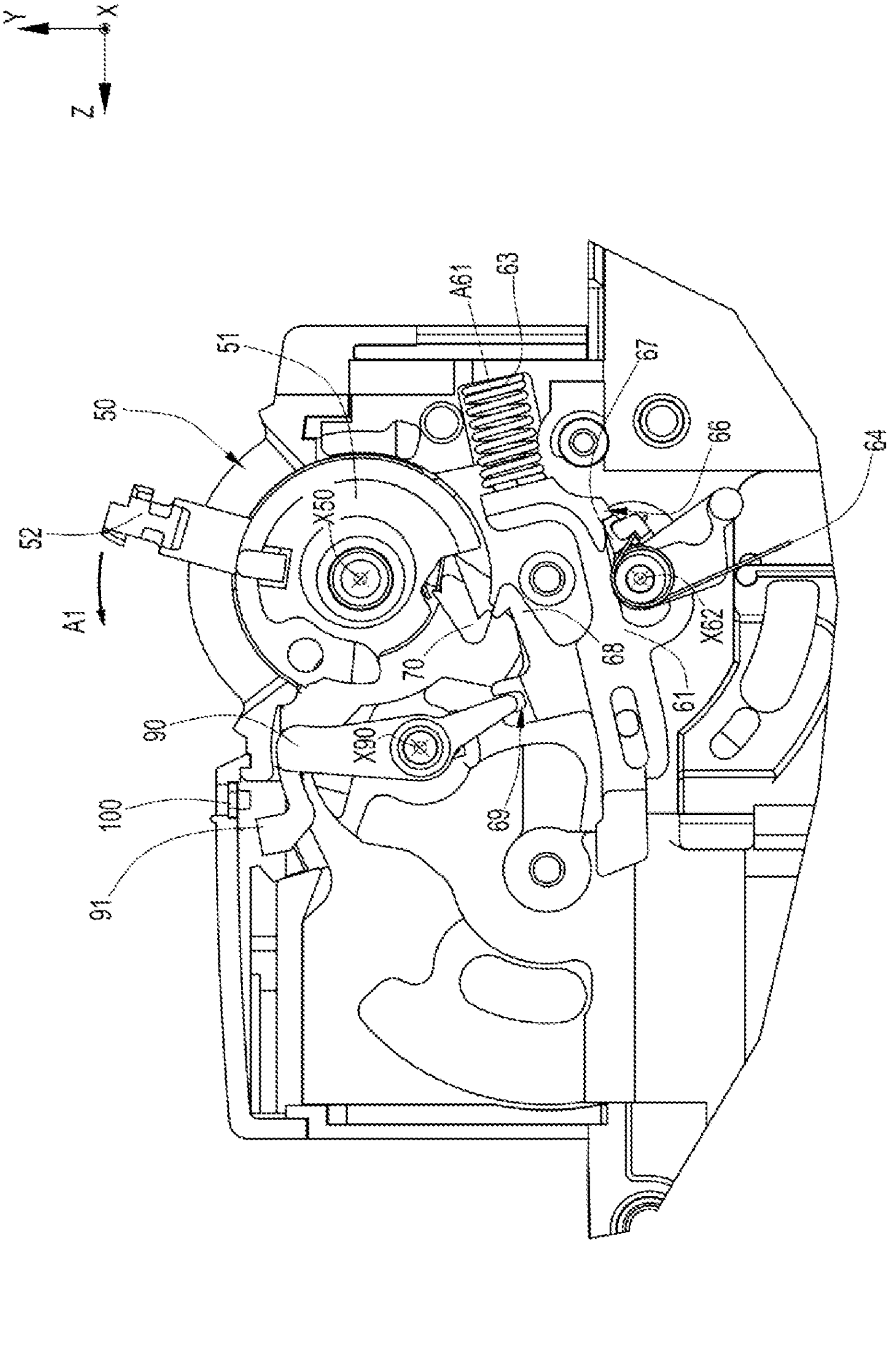
FIG. 7 is a similar view to that of FIG. 3, with the electrical protection device being in a fifth configuration.

The latch 62 is movable between a holding position, shown in FIGS. 2, 3 and 7, in which the latch 62 holds the slide 61 in the set position if the slide is in the set position, and an unlocked position, shown in FIGS. 4, 5 and 8, in which the latch 62 allows the slide 61 to be moved from its set position to its disengaged position. Advantageously, the latch 62 is supported by the casing 2. In order to be able to move in this way, the latch 62 is preferably pivotable relative to the casing 2, about an axis X62 that is fixed relative to the casing, called "latch axis" herein, parallel to the X direction. Preferably, for the sake of compactness, part of the latch 62 passes through one of the oblong openings in the slide 61 used to guide the slide 61, namely the opening 614 in the example.

The return spring 64 exerts a force, called "bias force", on the latch 62 that tends to return the latch 62 from the unlocked position to the holding position.

To enable the latch 62 to hold the slide 61 in the set position, the slide 61 is advantageously intended to comprise a locking relief 66, which mechanically engages with a blocking relief 67 belonging to the latch 62, when the latch 62 is in the holding position and when the slide 61 is in the set position, against the actuating force produced by the slide spring 63. In this situation, the latch 62 comes into abutment against the slide 61 in the opposite direction to its movement toward the disengaged position, in this case in the opposite direction to the Z direction. In order to be brought into abutment in this manner, the blocking relief 67 is intended to mechanically engage with the locking relief 66. Advantageously, the locking relief 66 is intended to be a concave surface, for example, a notch in the slide 61, and the blocking relief 67 is intended to be a projecting part, for example, a lug on the latch 62, which extends radially relative to the axis of rotation X62.

By contrast, when the latch 62 is in the unlocked position, and irrespective of the position of the slide 61, the latch 62 is no longer engaged on the slide 61, with the blocking relief 67 being offset from the locking relief 66, as explained hereafter. The latch 62 then allows the slide 61 to move, notably under the action of the slide spring 63.

Advantageously, when the slide 61 is in the disengaged position, the slide is intended to hold the latch 62 in the unlocked position by virtue of a projecting element of the slide 61. Typically, the projecting element can be part of the surface delimiting the notch, or, more generally, the locking relief 66 and extending transversely to the axis A61.

Once the tripping device 30 has been tripped, and when the detected fault is no longer present, the slide 61 must be returned from the disengaged position to the set position, i.e., the slide 61 must be reset.

To this end, the slide 61 comprises a slide hook 68. The slide hook 68 preferably extends in a plane parallel to the Y and Z directions, in a direction that is inclined relative to the axis A61.

A resetting hook 70 is hinged on the base 51. It preferably extends in a plane parallel to the Y and Z directions and generally in a radial direction relative to the axis X50. The resetting hook 70 is kinematically linked to the base 51. Thus, the rotation of the lever 50 induces an arc of a circle movement of the resetting hook 70 about the axis X50. The resetting hook 70 can also pivot about an axis X70, parallel to, and distinct from, the axis X50.

The respective ends of the resetting hook 70 and of the slide hook 68 are designed to be engaged, when they are in contact, by being bent so as to match each other.

When the slide 61 is in the set position and the switching lever 50 is in the closed position, the slide hook 68 is at a distance from the resetting hook 70 in a direction that has a component in the Z direction, as seen in FIG. 3. However, when the slide 61 is in the disengaged position, i.e., translationally moved with a movement that has a component in the Z direction along the axis A61, the switching mechanism 40 is in the tripped configuration and the switching lever 50 is in the open position. The resetting hook 70 has moved in an arc of a circle along the axis X50 with a movement that has a horizontal component in the Z direction; it then faces the slide hook 68 in a direction parallel to the axis A61, as shown in FIGS. 4 and 8.

The slide 61 is returned from the disengaged position to the set position by engaging the slide hook 68 and the resetting hook 70. Indeed, the actuation of the switching lever 50 by a user causes the switching lever 50 to pivot about the axis X50 in the direction of the arrow A1 in FIGS. 5 to 7, and causes the resetting hook 70 to pivot in the same direction, in an arc of a circle movement about the axis X50. The resetting hook 70 therefore moves with a horizontal component opposite to the Z direction. The end 702 of the resetting hook 70 then comes into abutment against the end 682 of the slide hook 68, as shown in FIG. 5. Thus, the resetting hook 70 and the slide hook 68 are engaged and can engage mechanically.

Figure 6:
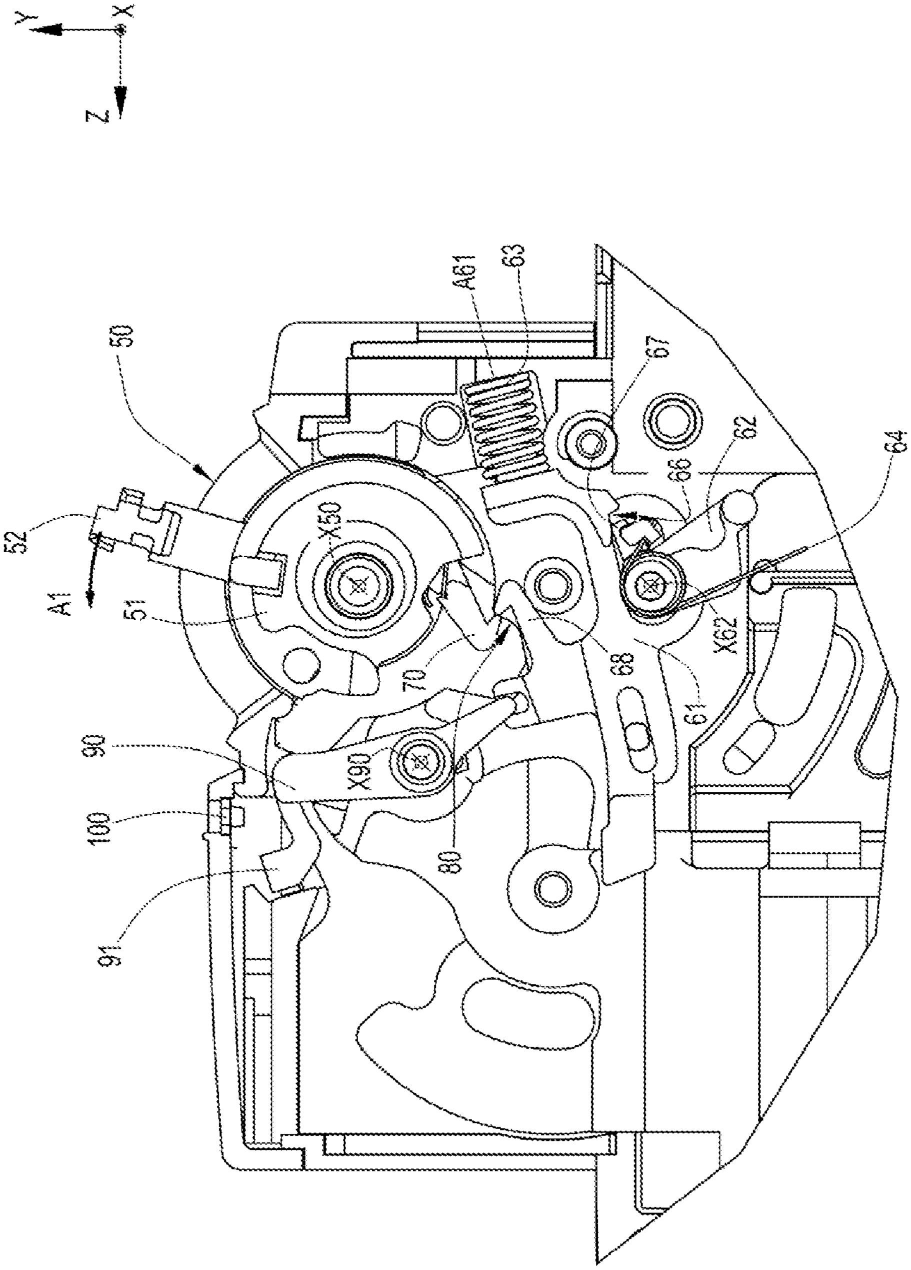
FIG. 6 is a similar view to that of FIG. 3, with the electrical protection device being in a fourth configuration.

Pivoting the switching lever 50 about the axis X50, between the configuration shown in FIG. 5 and the configuration shown in FIG. 6, drives the resetting hook 70, which drives the slide hook 68 as a result of the engagement achieved by engaging the ends 682 and 702. This causes the slide 61 to translationally move along the axis A61 in the direction that has a horizontal component opposite to the Z direction, i.e., toward its set position, against the resilient force exerted by the slide spring 63.

Preferably, the resetting hook 70 returns the slide 61 to its set position, and even beyond its set position. This ensures that the latch 62 returns to its holding position. Indeed, when the slide reaches or exceeds its set position, the blocking relief 67 no longer opposes the transition of the latch 62 from its unlocked position to its holding position, under the resilient force exerted by the spring 64. The latch thus automatically returns to its holding position.

Advantageously, a ramp 80 is provided on the casing 2, adjacent to the slide 61 in the X direction. The resetting hook 70 slides against the ramp 80 and passes over the ramp 80 when the switching lever 50 transitions from the open position to the closed position.

When the resetting hook 70 reaches the ramp 80, it continues to return the slide 61 to its set position, or even beyond this position, and the latch 62 transitions to the holding position. However, the slide 61 is not in abutment on the latch 62 because the slide 61 is held beyond its set position by the resetting hook 70. The purpose of the arc of a circle movement of the resetting hook 70 is to keep it in abutment against the ramp 80 and it allows the resetting hook 70 to cross over the ramp 80. This crossing over of the ramp 80 is facilitated by the pivoting of the resetting hook 70 relative to the lever 50, more specifically relative to the base 51, about the axis X70, which also allows the resetting hook 70 to disengage from the slide hook 68, as shown in FIG. 6. When the resetting hook 70 and the slide hook 68 are disengaged, the slide 61 transitions to the set position by being pushed back by the slide spring 63, while the latch 62 has returned to the holding position. The slide 61 is therefore once again held in its set position by the latch 62, as shown in FIG. 7. When the lever transitions from the configuration shown in FIG. 7 to that shown in FIGS. 2 and 3, the resetting hook 70 continues its arc of a circle movement about the axis X50 and the distance between the resetting hook 70 and the slide hook 68 increases in the direction opposite to the Z direction.

The slide 61 is thus returned to the set position, using the switching lever 50 actuated by the user.

The reset blade 65 is attached to the casing 2, being movable between a first position, shown in FIG. 2, and a second position, not shown, where the reset blade 65 has pivoted from the first position, clockwise in FIG. 2. In order to be able to move in this way, the reset blade 65 is advantageously pivotable relative to the casing 2 about an axis X65 parallel to the X direction. When a differential fault occurs, the movable rod 32 is actuated to its tripped position, in this case in the Z direction, so as to drive the reset blade 65 from its first position to its second position. Under the action of the movement of the movable rod 32 by the relay 31, the reset blade 65 drives the latch 62 from its holding position to its unlocked position, against the action of the spring 64. More specifically, the reset blade 65 drives the latch 62 via an actuating leg belonging to the latch 62. With the latch 62 in the unlocked position, the slide 61 is allowed to be moved from the set position to the disengaged position, under the action of the slide spring 63. In so doing, the slide 61 causes the switching mechanism 40 to switch from the set configuration to the tripped configuration, which in turn causes the first and second movable contacts 11 and 21 to switch from the conduction position to the isolation position. Thus, the protection device 1 is tripped.

As it pivots to the isolation position, the movable contact 11 drives the reset blade 65 to its first position. To do this, the contact holder 15 comprises an arm 152 that comes into abutment against the reset blade 65, in the opposite direction to the Z direction. The reset blade 65 is thus moved into its first position, or even beyond its first position, pushing the movable rod 32 in the direction opposite to the Z direction, thus resetting the tripping device 30.

In any case, the force amplifier 60 allows the tripping device 30 to cause the switching mechanism 40 to be set to the tripped configuration, notably by using the force produced by the slide spring 63, even if the actuation force on the rod 32 produced by the relay 31 is low. In particular, it is by allowing the slide 61 to be actuated by the spring 63 that the tripping device 30 trips the switching mechanism 40 to switch to the tripped configuration, with the slide 61 switching the switching mechanism 40 to the tripped configuration when the slide 61 reaches the disengaged position, by being allowed to do so by the latch 62 set to the unlocked position by the reset blade 65. This principle applies to the particular tripping device 30 described herein, but could be applied to any other type of tripping device producing a low force.

As an alternative embodiment, the tripping device 30 can be replaced by another type of tripping device configured to be initiated by an electrical fault of another predetermined type, in order to cause the switching mechanism 40 to be set to the tripped configuration.

In the event that the electrical protection device 1 comprises several tripping devices that actuate the same switching device 40 and the same switching lever 50, the transition of the switching lever 40 to the open position, caused by a tripping device other than the tripping device 30, does not influence the force amplifying device 60. The reset blade 65 is not moved, and the slide 61 and the latch 62 respectively remain in the set and holding positions. When the switching lever 50 transitions to the closed position, the resetting hook 70 is optionally engaged with the slide hook 68, but is, if applicable, disengaged during the passage of the ramp 80. The slide 61 is optionally pulled beyond its set position and, when the resetting hook 70 disengages during the passage of the ramp 80, returns to its set position, with the latch 62 still being in the holding position.

Advantageously, the transition of the slide 61 from the disengaged position to the set position occurs at the beginning of the stroke of the lever, typically for an angular stroke of the lever ranging between 0° and 30°, with the total stroke of the lever for transitioning from the open position to the closed position being approximately 80°, for example. Thus, the remainder of the angular stroke of the lever is dedicated to closing the first and second movable contacts 11 and 21, which transition from their isolated position to their conduction position. The switching mechanism 40 transitions from its tripped configuration to its set configuration, in order to transition the first and second movable contacts 11 and 21 to the conduction position. The switching mechanism 40 is thus reset.

The switching lever 50 comprises a snap-closing pawl 54, pivoting relative to the casing 2 about the lever axis X50, and more specifically visible in FIG. 9. As the switching lever 50 transitions from the open position to the closed position, the first and second movable contacts 11 and 21 respectively move toward the fixed contacts 12 and 22 in the Z direction, pivoting about the axis X11 under the action of the switching mechanism 40. The pivoting of the movable contact 21 is interrupted halfway through its stroke by the snap-closing pawl 54, which comes into abutment on a leg 26 of the contact holder 25, which prevents further pivoting of the movable contact 21 toward the fixed contact 22. The movable contact 11 continues to pivot until it comes into contact with the fixed contact 12. The movable contact 11 thus transitions to the conduction position, while the movable contact 21 is still in the isolation position. This transition of the movable contact 11 to the conduction position occurs, for example, when the angular stroke of the switching lever is 70°. The user continues to actuate the switching lever 50, slightly deforming the contact spring 46. The snap-closing pawl 54 continues its pivoting movement about the axis X50, sliding via an end surface 542 on a cam 262 formed by an edge of the leg 26, then passes through a step 264 in the leg 26 of the contact holder 25. After passing through the step 264, the contact holder 25 is no longer in abutment against the snap-closing pawl 54, and the contact 21 abruptly switches to its conduction position under the effect of the contact spring 46, which abruptly returns to its initial position.

To summarize, the snap-closing pawl 54 engages with the leg 26 in such a way as to hold the second movable contact 21 in its isolation position over a first portion of the closing stroke of the switching lever 50 and to release the second movable contact 21 upon passing a predetermined point of the stroke of the switching lever 50, after the movable contact 11 has already reached its conduction position. This ensures that, when the electrical protection device 1 is closed, the neutral conduction path 3 is closed before the phase conduction path 4. This prevents the formation of an electric arc when the second movable contact 21 transitions to the conduction position, particularly if the user is very slow to actuate the switching lever 50.

The electrical protection device 1 also comprises an indicator 90 housed in the casing 2. The indicator 90 is a mechanical indicator, i.e., a movable part, as shown, or several movable parts. The indicator 90 is movable relative to the casing 2, between a primary signaling position, shown in FIGS. 4, 5, 8 and 9, and a secondary signaling position, shown in FIGS. 2, 3, 6 and 7. In order to be movable, the indicator 90 is advantageously articulated on the casing 2, pivoting relative to the casing 2, about an axis X90, which is parallel to the X direction. Advantageously, the indicator 90 supports a light 91.

The casing 2 has a window 100, shown in FIGS. 2 to 9. The window 100 is disposed in the Z direction relative to the switching lever 50. The window 100 is preferably made of transparent material.

When the indicator 90 is in a secondary signaling position, the light 91 is offset relative to the window 100, so that it is not visible, or so as to be only partially visible, through the window 100. The indicator 90 is therefore in a "non-visible" position. This is the case in FIGS. 2, 3, 6 and 7. When the indicator 90 is in a primary signaling position, the light 91 is aligned so as to be visible through the window 100, or at least so as to be more visible than in the primary signaling position, as is the case in FIGS. 4, 5, 8 and 9, and is thus in a "visible" position. Thus, by observing the window 100 from outside the casing 2, the user is informed of the current position of the indicator 90, and therefore of the current configuration of the electrical protection device 1.

The indicator 90 is in the visible position in order to notify the user that the first and second movable contacts 11 and 21 have been placed in the isolation position by the tripping device 30. Thus, in the event that several tripping devices coexist in the same electrical protection device 1, the indicator 90 allows the user to distinguish the type of fault that has led to the first and second movable contacts 11 and 21 being placed in the isolation position by the electrical protection device 1, in this case a differential fault. Therefore, the indicator 90 is a "specific fault" indicator. The indicator 90 is in the non-visible position when the contacts 11 and 21 are in the conduction position and when the contacts 11 and 21 are in the isolation position, having been placed in the isolation position by opening the switching lever 50, whereas the tripping device 30 has not been initiated. When the switching lever 50 is moved from the open position to the closed position by the user, the indicator 90 is placed or kept in the non-visible position.

In order to achieve this operation of the indicator 90, the slide 61 is advantageously intended to be configured to place the indicator 90 in the visible position, when the slide 61 is placed in the disengaged position from the set position, and in the non-visible position when it is in the set position. To this end, the slide 61 comprises a notch 69, into which an arm 92 belonging to the indicator 90 is inserted, with the arm 92 generally extending in the direction opposite to the Y direction. The slide 61 thus causes the indicator 90 to pivot about the axis X90 to the visible position. Conversely, when the slide 61 is moved from the disengaged position to the set position, the indicator 90 pivots about the axis X90 as it is moved by the slide 61 to the non-visible position. The position of the indicator 90 is thus directly linked to the position of the slide 61.

Thus, a method for resetting the electrical protection device 1, from a configuration in which the first and second movable contacts 11 and 21 are in the isolation position, is defined as follows:

The user actuates the switching lever 50 by successively passing through the configurations shown in FIGS. 4 to 7 and then 3. A first step involves engaging the resetting hook 70 and the slide hook 68 by bringing their ends 682 and 702 together and bringing them into abutment. A second step involves translationally moving the slide 61 from the disengaged position to the set position, or even beyond the set position, resulting in the release of the latch 62, i.e., the fact that the latch 62 is released from its unlocked position. During this second step, the indicator 90 also pivots from the visible position to the non-visible position. A third step involves pivoting the latch 62 from the unlocked position to the holding position. The release of the latch 62 in the second step and its transition to the holding position in the third step occur in rapid succession. A fourth step involves disengaging the resetting hook 70 and the slide hook 68, facilitated by the pivoting of the resetting hook 70 about the axis X70, and by the ramp 80. A fifth step involves switching the switching mechanism 40 to the set configuration, i.e., resetting the switching mechanism 40, with the first and second movable contacts 11 and 12 transitioning to the conduction position. As mentioned previously, this transition is advantageously offset over time so that the second movable contact 21 transitions to the conduction position after the first movable contact 11.

Thus, the electrical protection device 1 is reliably reset, using the switching lever 50 that drives the resetting hook 70, resetting the force amplifier 60 when the switching lever transitions from the open position to the closed position. The resetting of the electrical protection device 1 is such that the differential tripping device 30 is reset before the flow of current is restored. Therefore, if the differential fault persists, the electrical protection device 1 interrupts the current again as soon as it is reset. The correct operation of the electrical protection device 1 is thus guaranteed, without making any operating changes for the user, who has no additional operations to perform in order to reset the electrical protection device 1, compared with their experience of known equipment.

The device of the invention is suitably compact, notably in the X width direction, while it can effectively react to one or more electrical faults. In particular, the structure of the force amplifier 60 and of the lever 50 is compact, to the extent that the casing 2 can be less than 25 mm wide, preferably less than 20 mm wide, even more preferably equal to 18 mm wide, even when it contains three tripping devices, including the tripping device 30.

Any feature described above for one embodiment or for an alternative embodiment can be implemented for the other embodiments and alternative embodiments described above, insofar as is technically feasible.

The invention claimed is:

1. An electrical protection device, comprising:

a casing;

a first conduction path, which comprises a first movable contact housed in the casing and movable between a conduction position and an isolation position;

a switching mechanism, which is housed in the casing and which is configured to switch between:

a set configuration, in which the switching mechanism places the movable contact in the conduction position; and a tripped configuration, in which the switching mechanism places the movable contact in the isolation position;

a first tripping device, which is housed in the casing and which is configured to trip switching of the switching mechanism from the set configuration to the tripped configuration when the first tripping device is initiated by a first type of electrical fault;

a switching lever;

rotatable about a lever axis;

operable by a user between an open position, for placing the switching mechanism in the tripped configuration, and a closed position, for placing the switching mechanism in the set configuration; and operable by the switching mechanism from its closed position to its open position, when the switching mechanism is switched to the tripped configuration under the effect of the first tripping device;

a slide, which comprises a locking relief and which is movable relative to the casing, between a set position and a disengaged position;

a slide spring, which applies an actuating force to the slide, tending to move the slide from the set position to the disengaged position;

a latch, which comprises a blocking relief configured to block the slide in the set position, the latch being movable between a holding position, in which the latch holds the slide in the set position by means of the blocking relief, which engages with the locking relief when the slide is in the set position, and an unlocked position, in which the blocking relief and the locking relief are offset relative to each other and the latch allows the slide to be moved from its set position to its disengaged position, the first tripping device being configured to move the latch from the holding position to the unlocked position when the first tripping device is initiated;

wherein the electrical protection device further comprises a resetting hook, kinematically linked to the switching lever, such that it moves with the switching lever when the switching lever rotates about the lever axis between its open position and its closed position;

the slide supports a slide hook;

when the slide is in the disengaged position:

the resetting hook and the slide hook face each other and are ready to be engaged by rotating the switching lever between its open position and its closed position;

the latch is held in the unlocked position by the slide;

when the slide is in the set position, the slide hook and the resetting hook are spaced apart from each other; and the transition of the switching lever from its open position to its closed position causes the slide hook and the resetting hook to engage and the switching lever to move the slide until the electrical protection device is reset, with the slide transitioning from its disengaged position to its set position and the switching mechanism switching to the set configuration.

2. The electrical protection device as claimed in claim 1, wherein the casing comprises a ramp for guiding the resetting hook configured to disengage the resetting hook and the slide hook when the switching lever transitions from its open position to its closed position.

3. The electrical protection device as claimed in claim 1, wherein the electrical protection device further comprises an indicator that is housed in the casing and that is movable relative to the casing between a visible position and a position not visible from outside the casing, and wherein the slide is adapted to place the indicator in the visible position when it is in the disengaged position, and to place the indicator in the non-visible position when the slide is in the set position.

4. The electrical protection device as claimed in claim 1, wherein:

the latch is rotatable between its holding position and its unlocked position about a latch axis;

the latch is subjected to the action of a return spring that returns it to its holding position;

the blocking relief is a lug that radially extends relative to the latch axis; and the locking relief is a notch in the slide configured to receive the blocking relief in the position for holding the latch.

5. The electrical protection device as claimed in claim 1, wherein:

the electrical protection device further comprises a second conduction path, which is electrically isolated from the first conduction path and which comprises a second movable contact housed in the casing and movable between a conduction position and an isolation position; and the first tripping device is a differential tripping device, which comprises:

a differential sensor, configured to be initiated when a differential current exceeds a predetermined threshold; and a relay, configured to drive the latch from the holding position to the unlocked position, by the sole action of electrical energy from the differential sensor, and generated under the effect of the differential current, while the differential current exceeds the predetermined threshold.

6. The electrical protection device as claimed in claim 5, wherein the first conduction path is a neutral conduction path, the second conduction path is a phase conduction path and the transition of the switching lever from its open position to its closed position causes the first movable contact to transition to its conduction position before the second movable contact transitions to its conduction position.

7. The electrical protection device as claimed in claim 6, further comprising a snap-closing pawl, configured to hold the second movable contact in its isolation position over a first portion of a displacement stroke of the switching lever between its open position and its closed position and to release the second movable contact on passing a predetermined point of the displacement stroke of the switching lever.

8. The electrical protection device as claimed in claim 1, comprising a second and a third tripping device and wherein the first tripping device is a differential tripping device, the second tripping device is an electrical overload tripping device and the third tripping device is a short-circuit tripping device.

9. The electrical protection device as claimed in claim 8, wherein the casing is less than 25 mm wide, preferably less than 20 mm wide, preferably equal to 18 mm wide.

10. A method for resetting the electrical protection device of claim 1, by actuating the switching lever so as to rotate about the lever axis, with this method comprising at least the following, which successively occur when the switching lever is actuated by the user:

a) engaging between the resetting hook and the slide hook;

b) translationally moving the slide from the disengaged position to the set position under the action of the resetting hook, until the latch is released from its unlocked position;

c) moving the latch from its unlocked position to its holding position;

d) disengaging the resetting hook and the slide hook; and e) switching the switching mechanism to the set configuration.

* * * * *